(12) United States Patent
Layne

(10) Patent No.: US 10,464,298 B1
(45) Date of Patent: Nov. 5, 2019

(54) METHOD FOR CREATING A CUSTOMIZABLE JOURNAL

(71) Applicant: Alia J Layne, Navarre, FL (US)

(72) Inventor: Alia J Layne, Navarre, FL (US)

( * ) Notice: Subject to any disclaimer, the term of this patent is extended or adjusted under 35 U.S.C. 154(b) by 0 days.

(21) Appl. No.: 15/917,621

(22) Filed: Mar. 10, 2018

(51) Int. Cl.
| | |
|---|---|
| B32B 37/00 | (2006.01) |
| B32B 38/00 | (2006.01) |
| B32B 29/00 | (2006.01) |
| B32B 7/12 | (2006.01) |
| B32B 37/12 | (2006.01) |
| B41M 5/00 | (2006.01) |

(52) U.S. Cl.
CPC .............. *B32B 37/025* (2013.01); *B32B 7/12* (2013.01); *B32B 29/002* (2013.01); *B32B 37/12* (2013.01); *B32B 38/145* (2013.01); *B32B 2038/0056* (2013.01); *B32B 2255/12* (2013.01); *B32B 2317/12* (2013.01); *B32B 2554/00* (2013.01); *B41M 5/0047* (2013.01)

(58) Field of Classification Search
CPC ....... B32B 37/025; B32B 7/12; B32B 29/002; B32B 37/12; B32B 38/145; B32B 2038/0056; B32B 2255/12; B32B 2317/12; B32B 2554/00; B41M 5/0047
USPC ................................................ 156/230, 235
See application file for complete search history.

(56) References Cited

U.S. PATENT DOCUMENTS

| | | | | |
|---|---|---|---|---|
| 5,665,194 A | * | 9/1997 | Kay | B32B 37/1284 |
| | | | | 156/285 |
| 9,079,681 B1 | * | 7/2015 | Schwendimann | B41M 5/502 |
| 9,815,318 B1 | * | 11/2017 | Steimann | B44C 1/1754 |
| 2002/0061451 A1 | * | 5/2002 | Kita | B41M 5/38257 |
| | | | | 430/2 |
| 2003/0113520 A1 | * | 6/2003 | Takahashi | B05D 5/061 |
| | | | | 428/201 |
| 2005/0014444 A1 | * | 1/2005 | Harata | A63H 33/22 |
| | | | | 446/227 |
| 2009/0130360 A1 | * | 5/2009 | Damman | B29C 55/023 |
| | | | | 428/41.3 |
| 2009/0301676 A1 | * | 12/2009 | Rosset | B32B 5/26 |
| | | | | 162/140 |
| 2015/0296906 A1 | | 10/2015 | Vasquez | |
| 2016/0207731 A1 | * | 7/2016 | Katayama | B32B 7/05 |
| 2016/0361945 A1 | * | 12/2016 | Mahajan | B41M 5/5254 |

FOREIGN PATENT DOCUMENTS

| | | | | |
|---|---|---|---|---|
| CN | 101112842 A | * | 1/2008 | |
| CN | 201175583 Y | * | 1/2009 | |
| JP | 3155300 B2 | * | 4/2001 | |

* cited by examiner

*Primary Examiner* — Sonya M Sengupta
(74) *Attorney, Agent, or Firm* — Peter Loffler

(57) ABSTRACT

A method to customize a journal or planner uses an ink transfer sheet having a desired image thereon such that the ink transfer sheet is positioned on one of the pages of the journal and the image on the ink transfer sheet is transferred to the journal's page in the appropriate manner for the particular type of ink transfer sheet used. Multiple sheets are used to customize the various pages of the journal. The ink transfer sheet can be any appropriate ink transfer sheet such as a decal sheet bound to an adhesive sheet or a silk screened transfer film bound to a backing paper with a non-slip layer therebetween.

12 Claims, 6 Drawing Sheets

METHOD FOR CREATING A CUSTOMIZABLE JOURNAL

BACKGROUND OF THE INVENTION

1. Field of the Invention

The present invention relates to a bound paper journal wherein the pages of the journal are readily customizable by the user.

2. Background of the Prior Art

While electronics are king, a large percentage of people still rely on pen and paper for much of their record keeping, including diaries, appointment journals, shopping lists, exercise logs, task logs, money spent logs, etc. Many paper record keepers buy task specific journals for each task at hand. A task specific journal has the internal pages designed and optimized for the specific targeted task. For example, a scheduling journal may have individual pages for each day of the week, possibly even broken down by the hour, or at least by the workday hour. While such task specific journals work well for the targeted task for which the journal is kept, it requires the obtainment of numerous journals which must be kept track of and juggled as needed. This can become a daunting and confusing task, often leading to frustration and possibly the abandonment of the use of one or more journals.

To address this issue, many people simply get blank journals wherein the internal pages of the journal are substantially blank, save possibly for page numbers and some small aesthetic design. As the pages are blank the user is free to keep records of numerous diverse tasks within the single journal so as to avoid the need to juggle multiple journals. While effective for simplifying the record keeping for various journals, the use of a blank journal presents its own hurdles. To be effective, the individual pages still need to be customized for the specific task tracked. For example, for pages devoted to tracking money spent, a user may want multiple rows, one for each money transaction, along with multiple columns for the rows, the columns including such headers as date, location spent, amount spent, item purchased, etc. Pages to track other tasks would need to be similarly configured for the particular task. While such configuration is strictly not necessary, it makes the job of entry into the journal as well as periodic review of the entries in the journal, substantially easier and many blank journal users will so configure their journal. The problem is of course that such configuration takes considerable time and effort, detracting from the placement of productive entries into the journal.

What is needed is a device that allows the various pages of an essentially blank page journal to be customized to fit the unique record keeping and task tracking needs of a user. Such a device must be relatively quick and easy to customize so as to not detract from the productive usage of the journal.

SUMMARY OF THE INVENTION

The method for creating a customizable journal of the present invention addresses the aforementioned needs in the art by providing an essentially blank page journal wherein each of the various essentially blank pages of the journal are customizable by the user in order to accomplish a task or tasks selected by the user. The process of customizing the various pages is relatively simple and straightforward and does not require special skills or tools to accomplish. The customization process is relatively inexpensive to accomplish so as to make the customizable journal economically attractive to potential consumers for this type of device.

The method for creating a customizable journal of the present invention is comprised of the steps of providing a journal having multiple pages, advantageously having multiple substantially blank pages or blank sectioned pages. An ink transfer sheet having an image thereon is provided and is positioned on a respective one page of the journal. The image from the ink transfer sheet is transferred onto the respective one page in appropriate fashion for the particular type of ink transfer sheet being used. The ink transfer sheet may be comprised of a decal sheet releasably bound to an adhesive sheet, a transfer film sheet releasably bound to a backing paper with a non-slip coating sandwiched therebetween, etc. A single ink transfer sheet can be used for each page or at least two ink transfer sheets can be applied to each page, either onto separate sections of the page and/or in overlaying fashion on the page.

BRIEF DESCRIPTION OF THE DRAWINGS

Similar reference numerals refer to similar parts throughout the several views of the drawings.

DESCRIPTION OF THE PREFERRED EMBODIMENT

Figure 1:
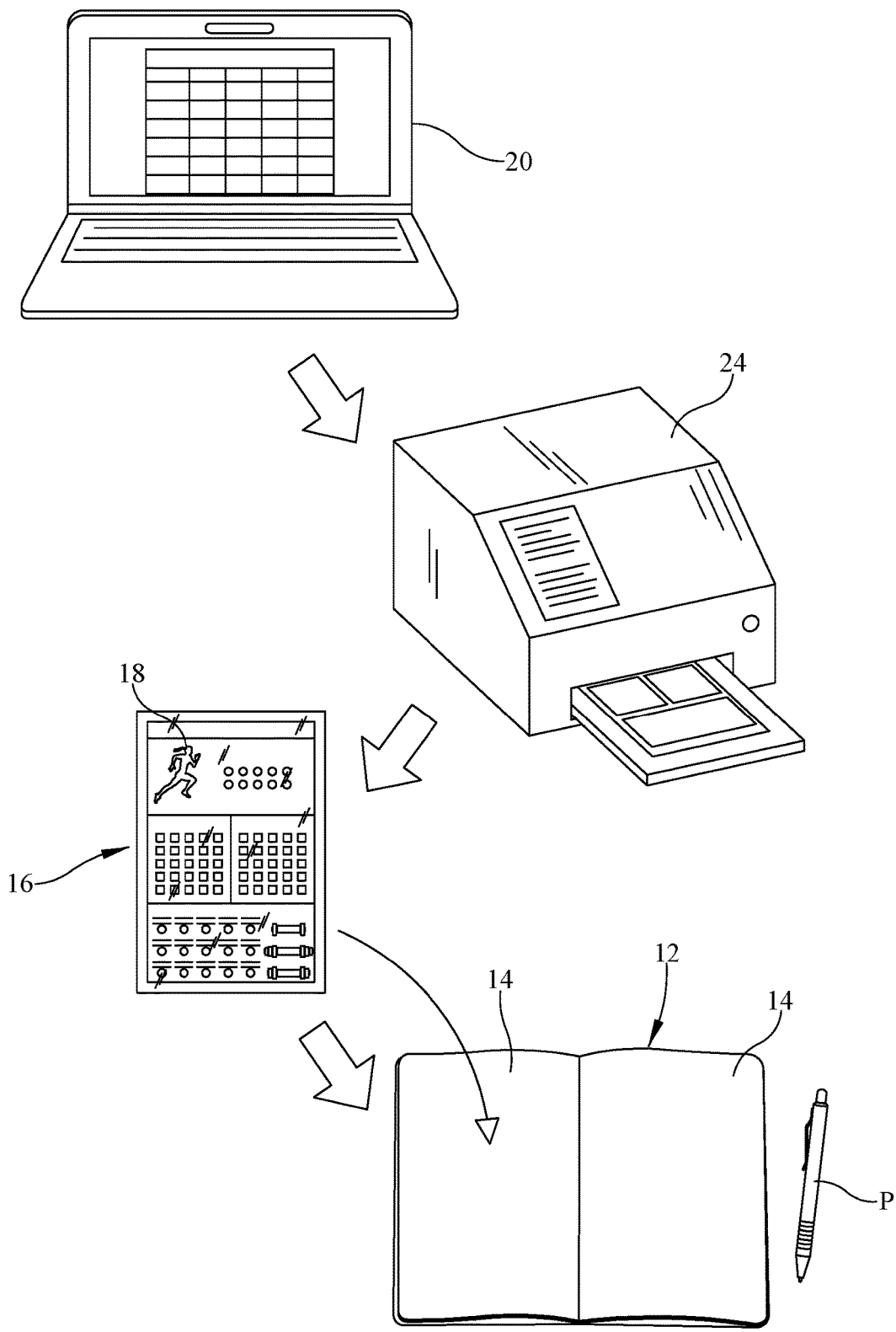
FIG. 1 illustrates the steps for practicing the method for creating a customizable journal of the present invention.
Figure 2:
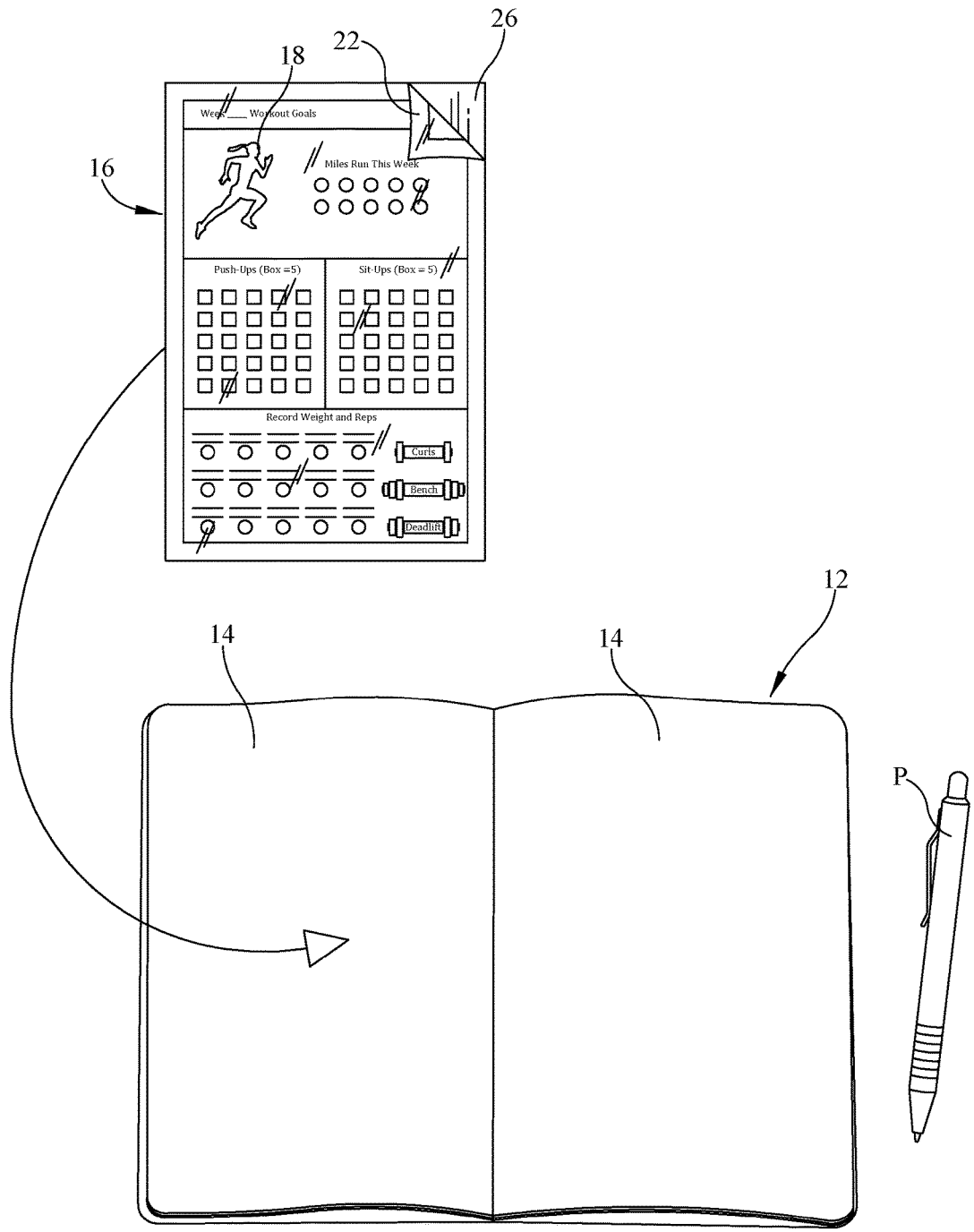
FIG. 2 illustrates the image transfer process of the method for creating a customizable journal.
Figure 3:
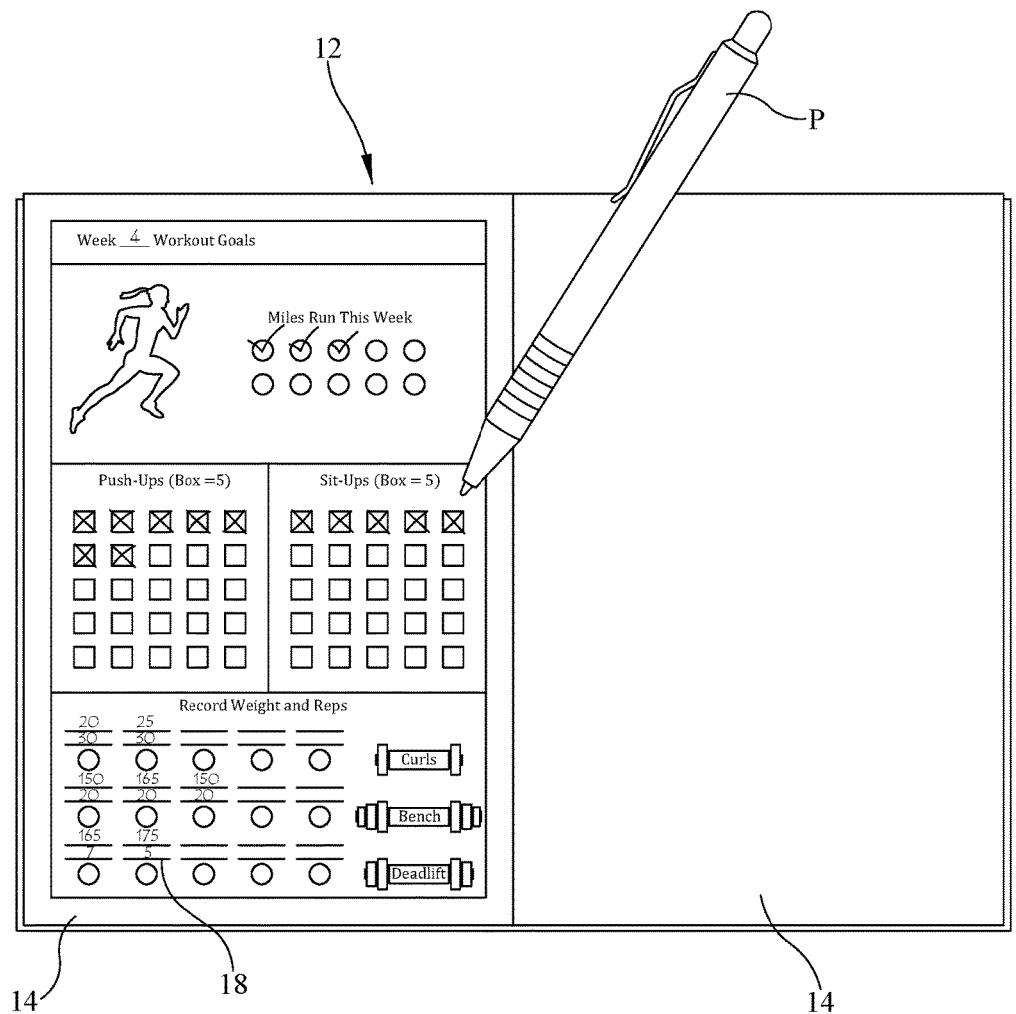
FIG. 3 shows usage of the journal created by the method for creating a customizable journal.
Figure 4:
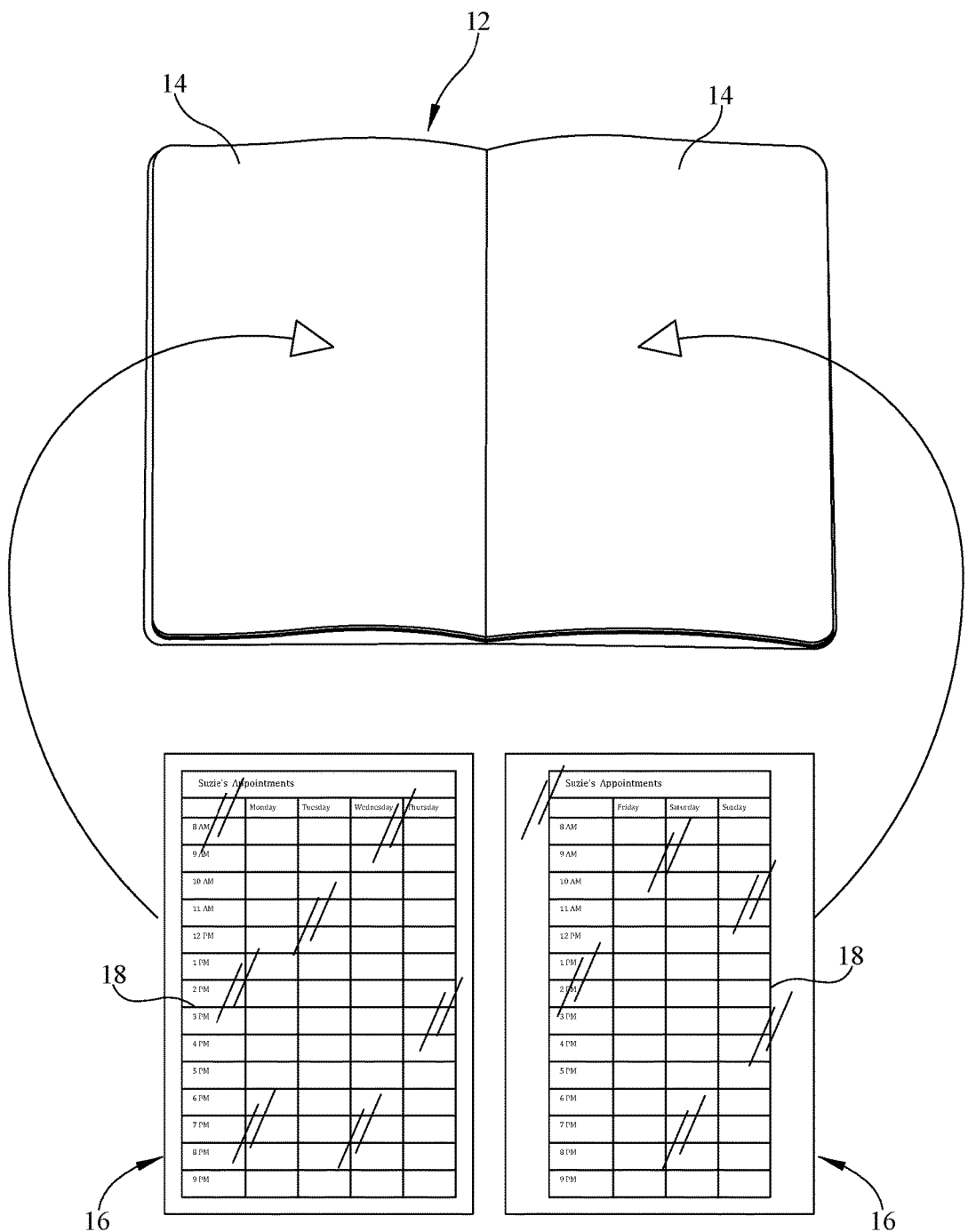
FIG. 4 illustrates producing a double image transfer across a butterfly opening using the method for creating a customizable journal.
Figure 5:
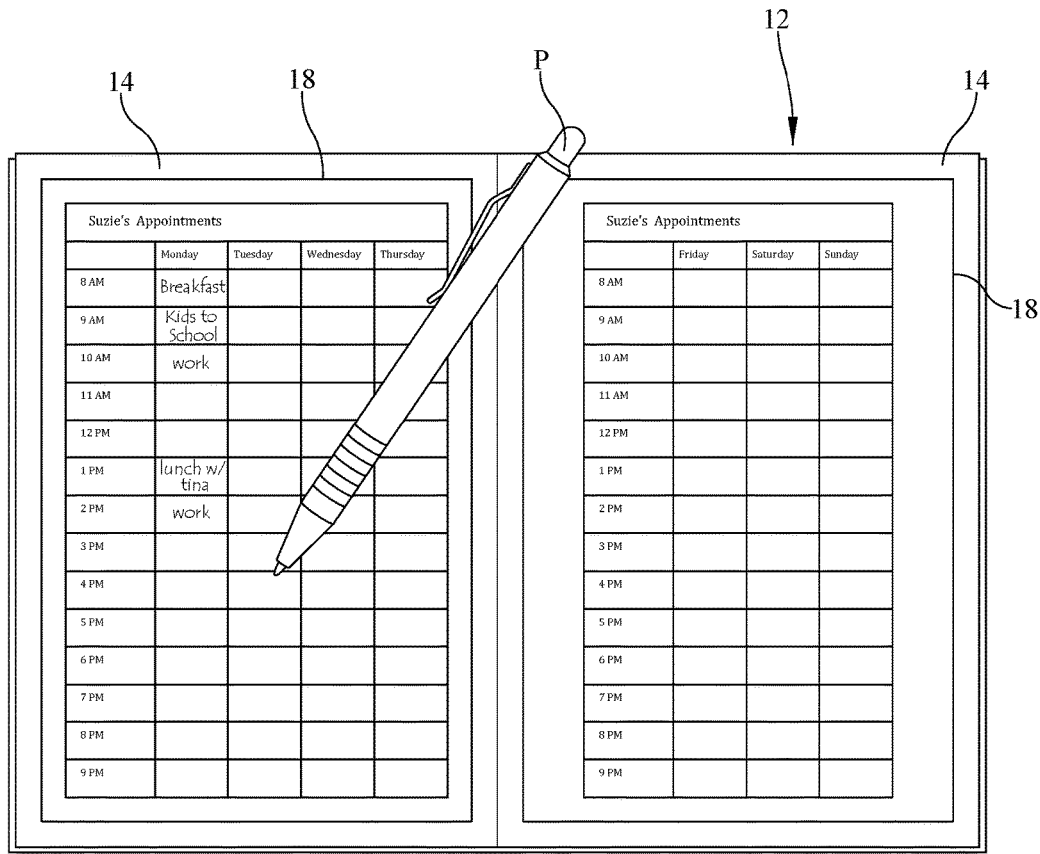
FIG. 5 shows usage of the journal created in FIG. 4 by the method for creating a customizable journal.
Figure 6:
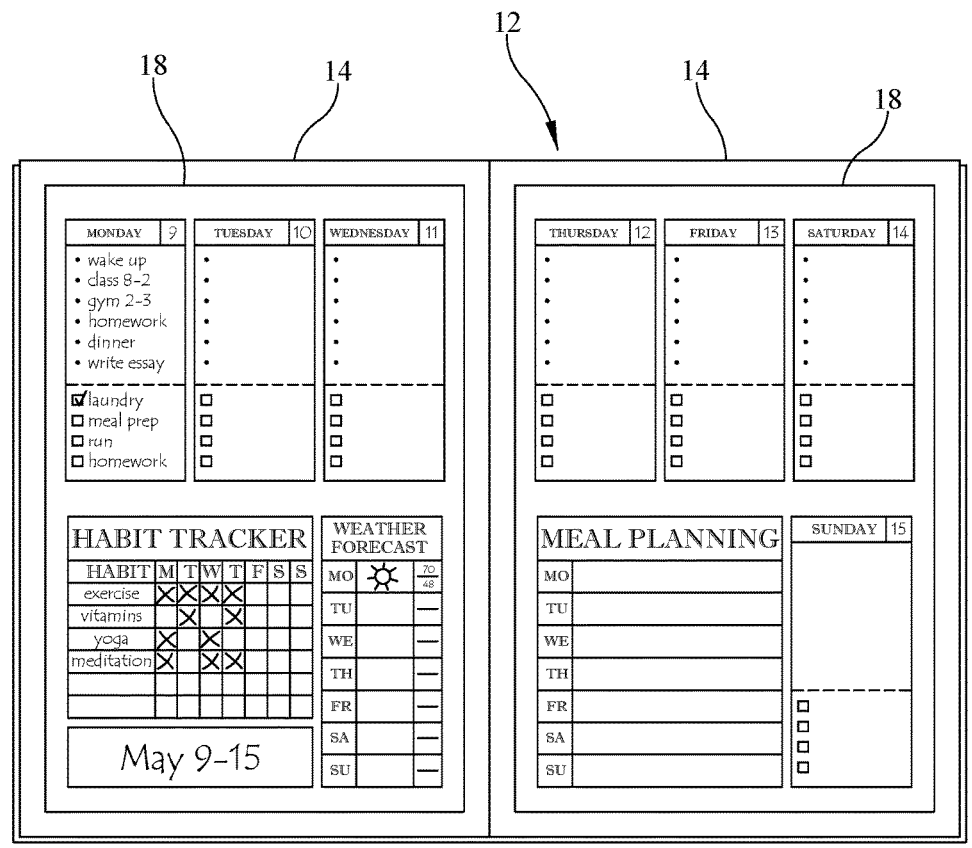
FIG. 6 illustrates yet another possible implementation for a journal using the FIG. 3 shows usage of the journal created by the method for creating a customizable journal.

Referring now to the drawings, it is seen that the method for creating a customizable journal utilizes a journal 12 of any appropriate type that has multiple paper pages 14 therein with at least some of them being substantially blank (mostly blank with the possibility of having page numbers and/or aesthetic designs) or at least having large sections of blank space thereon. An ink transfer sheet 16 having a desired image 18 thereon, is provided and is positioned on one of the pages 14 of the journal 12. Once an ink transfer sheet 16 is positioned on a page 14 of the journal 12 as desired, the then image 18 on the ink transfer sheet 16 is transferred to the page 14 in appropriate manner depending on the type of ink transfer sheet 16 being used (e.g., silkscreened backing paper-transfer film sheet ink transfer, adhesive sheet tattoo, etc.). The image 18 transferred, being an ink product, is allowed to dry, if drying is required by type of ink transfer sheet being used, on the page 14 and then the user is able to use the page 14 and the transferred image thereon as desired, such as making entries onto or within the image on the page 14 with an appropriate writing implement P. Each desired page 14 of the journal 12 is customized in similar fashion, which customization can occur immediately upon purchase of the journal 12 or over the course of time as the user sees fit.

Of course there is nothing preventing the user from transferring the same image onto each page 14 of the journal 12. This can occur for example, when a user wants a customized workout tracker and produces an appropriate workout tracker image, as more fully discussed below, and produces or obtains multiple ink transfer sheets 16 having this image 18 thereon and transfers the images 18 from each ink transfer sheet 16 onto a respective one of the pages 14 of the journal 12, having the journal 12 serve the singular purpose of being a fitness tracker notebook with a customized tracking system on each desired page 14 of the journal 12.

More than one ink transfer image 18 can be applied to a given page 14 of the journal, if desired. For example, an upper portion of the page 14 may have a paragraph to be read by a young child while a lower section of the page 14 can have a "score sheet" to keep track of how well the child read the paragraph inserted into the upper section of the page 14. Each temporary transfer sheet 16 is sized appropriately and applied, in turn, to the appropriate portion of the page 14. Additionally, two ink transfer sheets 16 (or more) can be applied to a given area on a page 14 of the journal 12 in order to overlay two different images on one page 14 or one section of a page 14. This can include overlaying an aesthetic image over a functional image on the page 14.

As mentioned, the ink transfer sheets 16 can be any appropriate image transfer sheet used for creating ink transfers. As seen, a do-it-yourself method can be used to create the ink transfer sheet 16 via computer 20 running appropriate graphic software. The desired image to be transferred is created on the computer 20 and then printed on appropriate ink transfer paper 22 (glossy decal paper) via an appropriate printer 24 (inkjet, laser, etc.) linked to the computer 20. An adhesive sheet 26 is applied to the transfer paper 22 in the usual way. Thereafter, the adhesive sheet 26 is removed and the ink transfer paper 22 pressed onto the page 14 of the journal 12 and wetted appropriately. This particular method of tattoo sheet 16 production allows the user to create custom transfer images 18 on each transfer sheet 16 including purely aesthetic designs if desired, in addition to the functional images produced, and in the size desired. Alternately, the ink transfer sheets 16 can be produced commercially, such as via silk screening stencils with the image printed onto a film (paper or plastic) backed by a backing paper and a non-slip release coating sandwiched therebetween or other appropriate methods of producing a ink transfer sheet, relieving the user of having to create the actual images. Irrespective of how the ink transfer sheets 16 are produced, the user can customize the journal 12 to his or her particular needs and tastes.

While the invention has been particularly shown and described with reference to an embodiment thereof, it will be appreciated by those skilled in the art that various changes in form and detail may be made without departing from the spirit and scope of the invention.

I claim:

1. A method for customizing a notebook comprising the steps of:
   providing a journal having multiple pages, each of the pages being made from paper;
   providing an ink transfer sheet having an image thereon;
   positioning the ink transfer sheet on a respective one page of the journal; and
   transferring the image from the ink transfer sheet onto the respective one page.

2. The method for customizing a notebook as in claim 1 wherein the ink transfer sheet is comprised of a decal sheet releasably bound to an adhesive sheet.

3. The method for customizing a notebook as in claim 1 wherein the ink transfer sheet is comprised of a transfer film sheet releasably bound to a backing paper with a non-slip coating sandwiched therebetween.

4. The method for customizing a notebook as in claim 1 wherein the ink transfer sheet is comprised of either a decal sheet releasably bound to an adhesive sheet or a transfer film sheet releasably bound to a backing paper with a non-slip coating sandwiched therebetween.

5. A method for customizing a notebook comprising the steps of:
   providing a journal having multiple pages, each of the pages being made from paper;
   providing a first ink transfer sheet having a first image thereon;
   positioning the first ink transfer sheet on a first section of a respective one page of the journal;
   transferring the first image from the first ink transfer sheet onto the first section of the respective one page;
   providing a second ink transfer sheet having a second image thereon;
   positioning the second ink transfer sheet on a second section of a respective one page of the journal; and
   transferring the second image from the second ink transfer sheet onto the second section of the respective one page.

6. The method for customizing a notebook as in claim 5 wherein the first ink transfer sheet is comprised of a first decal sheet releasably bound to a first adhesive sheet and the second ink transfer sheet is comprised of a second decal sheet releasably bound to a second adhesive sheet.

7. The method for customizing a notebook as in claim 5 wherein the first ink transfer sheet is comprised of a first transfer film sheet releasably bound to a first backing paper with a first non-slip coating sandwiched therebetween and the second ink transfer sheet is comprised of a second transfer film sheet releasably bound to a second backing paper with a second non-slip coating sandwiched therebetween.

8. The method for customizing a notebook as in claim 5 wherein the first ink transfer sheet is comprised of either a decal sheet releasably bound to an adhesive sheet or a transfer film sheet releasably bound to a backing paper with a non-slip coating sandwiched therebetween.

9. A method for customizing a notebook comprising the steps of:
   providing a journal having multiple pages, each of the pages being made from paper;
   providing a first ink transfer sheet having a first image thereon;
   positioning the first ink transfer sheet on a section of a respective one page of the journal;
   transferring the first image from the first ink transfer sheet onto the section of the respective one page;
   providing a second ink transfer sheet having a second image thereon;
   positioning the second ink transfer sheet on the respective one page of the journal overlaying at least a portion of the section; and
   transferring the second image from the second ink transfer sheet onto the respective one page.

10. The method for customizing a notebook as in claim 9 wherein the first ink transfer sheet is comprised of a first decal sheet releasably bound to a first adhesive sheet and the second ink transfer sheet is comprised of a second decal sheet releasably bound to a second adhesive sheet.

11. The method for customizing a notebook as in claim 9 wherein the first ink transfer sheet is comprised of a first transfer film sheet releasably bound to a first backing paper with a first non-slip coating sandwiched therebetween and the second ink transfer sheet is comprised of a second transfer film sheet releasably bound to a second backing paper with a second non-slip coating sandwiched therebetween.

12. The method for customizing a notebook as in claim 9 wherein the ink transfer sheet is comprised of either a decal sheet releasably bound to an adhesive sheet or a transfer film sheet releasably bound to a backing paper with a non-slip coating sandwiched therebetween.

\* \* \* \* \*